C. H. BUTLER.
STREET SWEEPER.
APPLICATION FILED AUG. 25, 1914.

1,134,586.

Patented Apr. 6, 1915.
2 SHEETS—SHEET 1.

WITNESSES:

INVENTOR
Charles H. Butler,
BY G. H. Strong.
ATTORNEY

C. H. BUTLER.
STREET SWEEPER.
APPLICATION FILED AUG. 25, 1914.

1,134,586.

Patented Apr. 6, 1915.
2 SHEETS—SHEET 2.

WITNESSES:
Charles Rokles
Thos Leathery

INVENTOR
Charles H. Butler
BY G. H. Strong
ATTORNEY

UNITED STATES PATENT OFFICE.

CHARLES H. BUTLER, OF OAKLAND, CALIFORNIA.

STREET-SWEEPER.

1,134,586.  Specification of Letters Patent.  Patented Apr. 6, 1915.

Application filed August 25, 1914. Serial No. 858,549.

*To all whom it may concern:*

Be it known that I, CHARLES H. BUTLER, a citizen of the United States, residing at Oakland, in the county of Alameda and State of California, have invented new and useful Improvements in Street-Sweepers, of which the following is a specification.

This invention relates to street sweepers, and pertains especially to a multiple transmission for operating the broom either in conjunction with, or independently of, the vehicle drive.

The object of the present invention is to provide a transmission mechanism for street sweeping machines, whereby the broom may be driven at a constant speed regardless of the speed of progression or direction of travel of the vehicle.

The invention consists of the parts and the construction and combination of parts as hereinafter more fully described and claimed, having reference to the accompanying drawings, in which—

Figure 1:
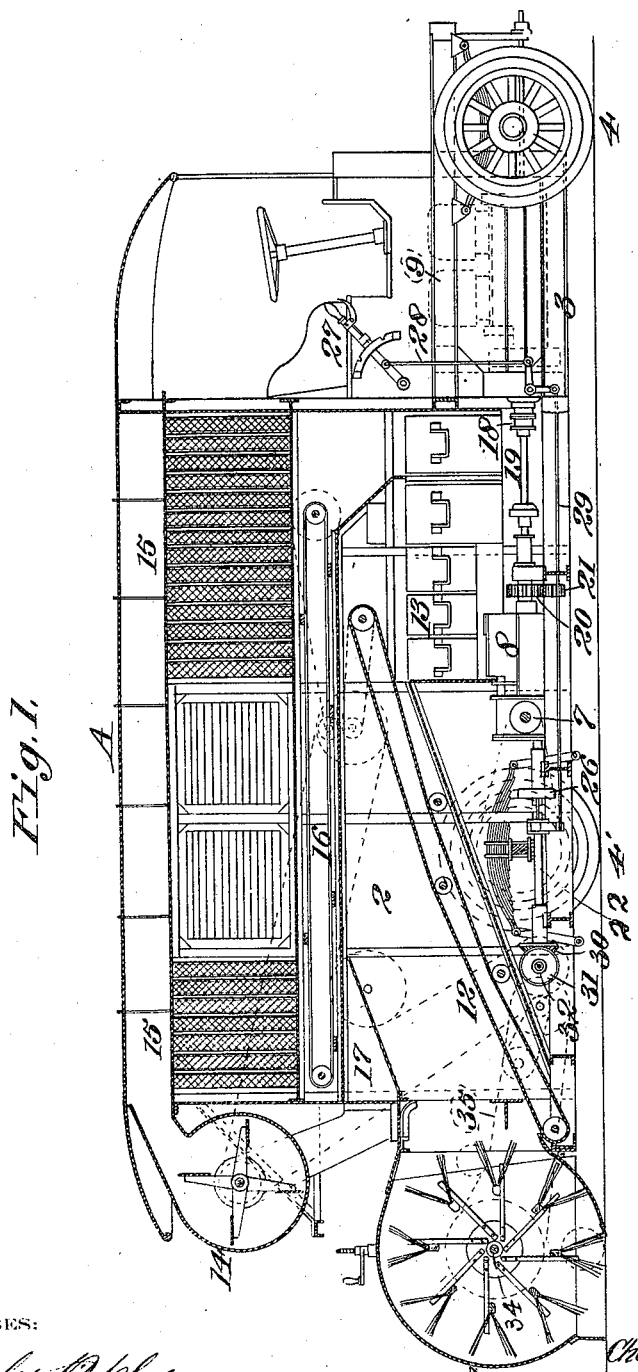
Figure 2:
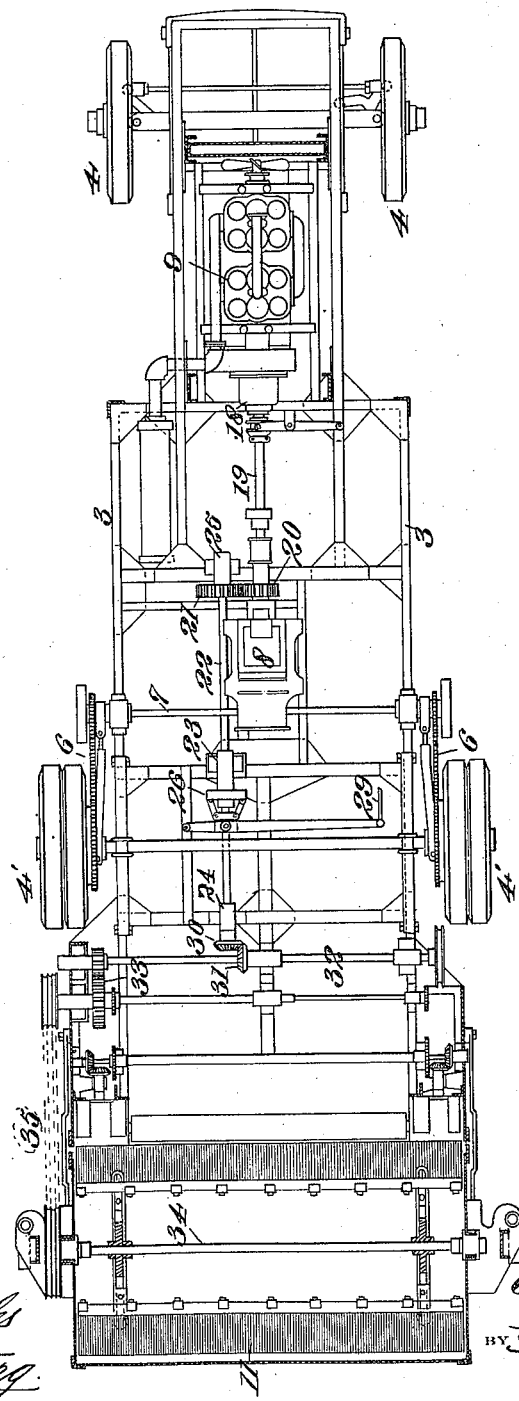

Figure 1 is a central vertical section in side elevation of the street sweeping machine. Fig. 2 is a plan section showing the multiple driving transmissions of the vehicle and broom.

Referring to the drawings, A indicates a street sweeping machine, consisting in general of a housing 2 and a frame 3 which is supported on front and rear wheels 4—4'; the rear wheels 4' being driven by a chain drive 6 from a jack-shaft 7 directly connected with a transmission 8 and an engine 9.

A revolving broom 11 is mounted at the rear of the machine. A conveyer belt 12 elevates the coarser sweepings and deposits them in a suitable collecting chamber 13. A fan 14 induces the necessary suction through the broom and blows the fine material and dust through a series of settling devices 15, a belt 16 taking the deposits from the settling device 15 and depositing them in a chamber 17.

The subject matter of the present invention relates to the driving connection formed between the broom and the engine shaft and between the engine shaft and vehicle drive wheels. This is accomplished in the following manner: 18 indicates the engine clutch, 19 the intermediate shaft, which connects the transmission 8 with the engine, and 20 a spur gear secured to shaft 19 just ahead of the transmission case. Intermeshing with said gear is a second spur gear 21 which is secured on a secondary sectional shaft 22, carried by journals 23—25 on one side of the main transmission. The sections of the secondary shaft are adapted to be connected together by a suitable form of clutch 26, controlled from the driver's seat by a lever 27 and a series of connecting links 28 and 29. Secured on the outer end of the rear section of shaft 22 is a bevel gear 30 which intermeshes with a second bevel gear 31 secured upon a shaft 32 journaled crosswise of the frame. Power is then finally transmitted to the broom through a pair of reducing gears 33, shaft 34, and a rope transmission 35.

During the operation, the vehicle, upon which the broom, with connected conveyer belt and collecting chamber, is mounted, is driven at a variable speed by means of the standard form of transmission, indicated at 8, which is connected through the intermediate shaft 19 with the engine 9.

When it is desired to operate the broom it is only necessary for the driver to swing lever 27 into a position where clutch 26 will engage. A direct drive from intermediate shaft 19 is thus formed with the broom through gears 20 and 21, the sections of shaft 22, gears 30 and 31, reducing gears 33, and rope drive 35. A constant uniform speed will thus be transmitted to the broom regardless of the speed of the vehicle or the direction of travel of the same; that is, the vehicle may be traveling on the low or high gear, or may be thrown into the reverse position without affecting the speed or direction in which the broom is driven. Also when stopping sweeping operations and going to or returning from work or at other times, it is possible to render the broom inoperative and stop it by simply throwing out clutch 26 to interrupt the driving connection between the sections of shaft 22. Shaft 22, together with gear 21, will in that instance run idle and will not affect the operation of the main transmission nor the driving connections formed between same and the rear driving wheels 4.

The multiple transmission thus produced is very simple in construction and effective in operation. A great saving in power is effected in the present case when the vehicle is moving from one point to another between which it is not necessary to sweep.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. In a machine of the type set forth, an engine having a driving shaft, a multi-speed transmission connected to the driving shaft, a gear on the driving shaft between the engine and transmission, a jack shaft connected to the transmission for driving the traction wheels of the machine, a sectional secondary shaft, a gear on one of the secondary shaft sections meshed with the driving shaft gear, a clutch for connecting the secondary shaft sections, a rotatable broom, a broom shaft, means to drive the broom from the broom shaft, and gearing between the broom shaft and the other secondary shaft section.

2. In a machine of the type set forth, a multi-speed transmission, an engine having a drive shaft which latter leads into the transmission at one end thereof, a shaft connected to the transmission to drive the traction wheels of the machine, a rotatable broom, a secondary sectional shaft, means to rotate the broom from one of said secondary shaft sections, means to couple and uncouple the sections of said secondary shaft, and means between the engine and transmission and directly connected to the drive shaft independent of the transmission for driving the other secondary shaft section from the drive shaft.

In testimony whereof I have hereunto set my hand in the presence of two subscribing witnesses.

CHARLES H. BUTLER.

Witnesses:
 JOHN H. HERRING,
 W. W. HEALEY.